(12) United States Patent
Jiang

(10) Patent No.: US 10,948,382 B2
(45) Date of Patent: Mar. 16, 2021

(54) SYNCHRONOUS LOAD SIMULATING DEVICE FOR DOUBLE OUTPUT SHAFTS OF SCOOTER DRIVE AXLE

(71) Applicant: HENGDIAN GROUP INNUOVO ELECTRIC CO., LTD, Zhejiang (CN)

(72) Inventor: Junwei Jiang, Zhejiang (CN)

(73) Assignee: HENGDIAN GROUP INNUOVO ELECTRIC CO., LTD., Dongyang (CN)

( * ) Notice: Subject to any disclaimer, the term of this patent is extended or adjusted under 35 U.S.C. 154(b) by 283 days.

(21) Appl. No.: 16/231,981

(22) Filed: Dec. 25, 2018

(65) Prior Publication Data

US 2019/0204181 A1    Jul. 4, 2019

(30) Foreign Application Priority Data

Dec. 30, 2017    (CN) .......................... 201711492200.3

(51) Int. Cl.
*G01M 13/025*    (2019.01)
(52) U.S. Cl.
CPC ................... *G01M 13/025* (2013.01)
(58) Field of Classification Search
CPC . G01M 13/025; G01M 13/026; G01M 17/007
See application file for complete search history.

(56) References Cited

U.S. PATENT DOCUMENTS 10,048,169 B2 *   8/2018   Yao .................... G01M 17/0074
10,473,204 B2 *  11/2019   Shentu ................ F16H 37/0813
10,663,062 B2 *   5/2020   Shentu .................. F16H 61/664

FOREIGN PATENT DOCUMENTS

CN              107246464 A       10/2017

* cited by examiner

*Primary Examiner* — Freddie Kirkland, III
(74) *Attorney, Agent, or Firm* — Jiwen Chen; Jacobson Holman PLLC

(57) ABSTRACT

A synchronous load simulating device includes a bottom plate, left and right sides of which are provided with a fixed plate, each of lower portions of which forms a first hole and is provided with a first bearing; a transmission shaft is fixed to the fixed plate through the first bearing, and each of two ends of the transmission shaft passes through one fixed plate and is provided with a lower transmission gear; each of upper portions of the fixed plates forms a second hole and is provided with a second bearing; each second bearing is fixed to a movable shaft, one end of which is located between the two fixed plates and is matched with a first coupler, and the other end of which passes through the fixed plate and is provided with an upper transmission gear; and each upper transmission gear is engaged with one lower transmission gear.

10 Claims, 2 Drawing Sheets

SYNCHRONOUS LOAD SIMULATING DEVICE FOR DOUBLE OUTPUT SHAFTS OF SCOOTER DRIVE AXLE

CROSS REFERENCE TO RELATED APPLICATIONS

The present application claims the benefit of Chinese Patent Application No. 201711492200.3 filed on Dec. 30, 2017, the contents of which are incorporated herein by reference in its entirety.

TECHNICAL FIELD

The present application relates to a synchronous load simulating device for double output shafts of a scooter drive axle.

BACKGROUND ART

A scooter drive axle (such as a scooter drive axle in Chinese Patent Application No. 201710052917.X) includes a motor and a box body. A transmission mechanism is disposed in the box body and a left output shaft and a right output shaft are matched in the box body. Each of the left output shaft and the right output shaft is used for being in linkage with a wheel. A fixed pipe is fixed to a left side and a right side of the box body so as to be used for protecting the left output shaft and the right output shaft. A fixed base is fixed to each of the fixed pipes, and the fixed base is composed of a fixed base inner segment and a fixed base outer segment. The fixed base outer segment is of a square structure, and the fixed base inner segment is of a round structure. A circumferential outer edge of the fixed base inner segment is located on an outer side of a circumferential outer edge of the fixed base outer segment. The fixed base is used for being matched with a frame for positioning, so as to determine a fixed position of the scooter drive axle. After installation of the scooter drive axle is completed, electrical performance testing of the scooter drive axle needs to be carried out. Brake locking of the right output shaft cannot be caused in case of brake locking of the left output shaft of the scooter drive axle, a rotating speed can change when the left output shaft bears force and a rotating speed of the right output shaft cannot be affected. Asynchronous rotating of the left output shaft and the right output shaft can be caused when force borne by the left output shaft is different from force borne by the right output shaft, thus it is very difficult to guarantee consistency of the rotating speed of the left output shaft and that of the right output shaft, which making electrical performance testing inaccurate.

SUMMARY OF THE INVENTION

The present invention is directed to a synchronous load simulating device for double output shafts of a scooter drive axle, which can guarantee consistency of a rotating speed of a left output shaft and a rotating speed of a right output shaft, so as to make electrical performance testing accurate.

To achieve the foregoing objectives, the present invention adopts the following technical solutions: the synchronous load simulating device for the double output shafts of the scooter drive axle includes a bottom plate, where each of a left side and a right side of the bottom plate is provided with a fixed plate, each of lower portions of the fixed plates forms a left-right through first fixed hole and is provided with a first bearing in a matching manner, a transmission shaft is fixed to the fixed plate through the first bearing, each of two ends of the transmission shaft passes through one fixed plate and is fixedly provided with a lower transmission gear, each of upper portions of the fixed plates forms a left-right through second fixed hole and is provided with a second bearing in a matching manner, each second bearing is fixed to a movable shaft, one end of the movable shaft is located between the two fixed plates and is matched with a first coupler, the other end of the movable shaft passes through the fixed plate and is fixedly provided with an upper transmission gear, each upper transmission gear is engaged with one lower transmission gear, the movable shaft has an accommodating groove formed in an axial direction of the movable shaft, the accommodating groove extends to one end away from the first coupler and runs through an axial end face of the movable shaft, an adjusting rod is disposed in the accommodating groove, one end of the adjusting rod extends to a radial outer side to form an adjusting rod boss, the other end of the adjusting rod extends to an outer side of the movable shaft, an end socket is fixed to a groove opening position of the accommodating groove of the movable shaft, the end socket has a clearing hole for the adjusting rod to pass through, the adjusting rod is sleeved with a compression spring, one end of the compression spring urges the adjusting rod boss, the other end of the compression spring urges the end socket, the movable shaft forms a first groove and a second groove running through a radial inner wall and a radial outer wall of the movable shaft, the first groove is formed in the axial direction of the movable shaft, an acute included angle is formed by the second groove and the first groove, one end of the second groove is oppositely located between two axial ends of the first groove, the other end of the second groove extends to a side of the upper transmission gear and is connected with one end, close to the upper transmission gear, of the first groove, the adjusting rod boss is fixed to a positioning pin, the positioning pin passes through the first groove or the second groove so as to be fixed to the first coupler, a second coupler is detachably fixed to each of the two output shafts of the drive axle, and the second coupler is used for being in linkage with the first coupler; the drive axle is placed between the two fixed plates, when the positioning pin is located in the first groove, under the effect of the compression spring, the adjusting rod is pushed so as to drive the first coupler to move towards the second coupler, and when the positioning pin is located in the second groove, under the effect of the compression spring, the positioning pin is pushed to one end, away from the upper transmission gear, of the second groove, and the second coupler and the first coupler are separated from each other.

When the device of the present invention is used, the second coupler capable of being matched with the first coupler is fixed to each of end portions of the two output shafts of the drive axle, then the drive axle is placed on an upper side of the bottom plate, and then the adjusting rod is rotated, so that the adjusting rod drives the positioning pin to move in the second groove, and the positioning pin moves towards a side of the upper transmission gear. When the positioning pin is moved to a bottom, that is, when the positioning pin is moved to one end where the first groove is connected with the second groove, a detecting person looses the positioning pin; because the first groove is parallel with an axis of the movable shaft, under the effect of the compression spring, the positioning pin can drive the first coupler to move along the first groove to a side of the drive axle, so that the first coupler can be matched with the second coupler. The adjusting rods on the left side and the right side are rotated, so that each of the two first couplers can be matched with one second coupler, the two output shafts of the drive axle perform linkage through the second coupler, the first coupler, the movable shaft, the upper transmission gear, the lower transmission gear and the transmission shaft, synchronous load simulating of the two output shafts of the drive axle is achieved, and subsequent electrical performance testing is conveniently performed.

Preferentially, the first coupler has a through groove through in an axial direction, a radial inner wall of the through groove and the movable shaft radially outwardly form a plurality of guide bumps and guide grooves which are mutually matched and annularly and uniformly disposed at intervals, and each of the guide bumps and the guide grooves is disposed in the axial direction of the movable shaft. Linkage of the first coupler and the movable shaft is achieved by means of matching of the guide bumps and the guide grooves, so that the first coupler and the movable shaft can synchronously rotate.

Preferentially, the first coupler forms a plurality of first linkage bumps facing the second coupler, the second coupler forms a plurality of second linkage bumps facing the first coupler, when the first coupler is matched with the second coupler, each first linkage bump is located between two second linkage bumps, and each second linkage bump is located between two first linkage bumps. By means of the above disposal, matching linkage of the first coupler and the second coupler is convenient. When the first coupler moves in an axial direction of a rotating shaft, the first linkage bump can be located between two second linkage bumps. The drive axle is powered on, so that the second coupler on the outputting shaft rotates, the second linkage bumps of the second coupler can be attached to the first linkage bumps of the first coupler along a surface on a side of a rotating direction of the output shaft, and linkage of the first coupler and the second coupler is achieved.

Preferentially, the first coupler has a through groove through in an axial direction so as to be used for being matched with the movable shaft, the first coupler forms an inside and outside through matching groove, an end portion of the positioning pin is located in the matching groove, and a radial section, along the first coupler, of the matching groove is disposed in a shape of a sector. By means of the above disposal, manufacturing and machining of the first coupler of the present invention are more convenient, and a contact area of the positioning pin and the first coupler is increased, so that the positioning pin pushes and pulls the first coupler more easily, and the service life of the positioning pin can be prolonged.

Preferentially, each of two opposite sides of the movable shaft is provided with the first groove and the second groove, two opposite sides of the first coupler are provided with the matching grooves, a middle portion of the positioning pin is fixed to the adjusting rod boss of the adjusting rod, and each of two ends of the positioning pin passes through the movable shaft so as to extend into one matching groove. By means of the above disposal, manufacturing and machining of the movable shaft of the present invention are more convenient, so that the positioning pin pushes and pulls the first coupler more easily, and the service life of the positioning pin can be prolonged.

Preferentially, the bottom plate is provided with two vertical plates, an upper end surface of the vertical plate is downwards recessed so as to form a reserved groove, a groove bottom of the reserved groove is a flat surface, a front groove wall or/and a rear groove wall of the reserved groove is a flat surface, a pressing plate is disposed on an upper side of the vertical plate, the pressing plate is detachably fixed to the vertical plate through a fastener, or the pressing plate is fixed to a lower end of a lifting rod of a lifting device. The present invention is provided with the reserved groove with a right-angle surface or in a U shape, the fixed bases on the two sides of the drive axle can be positioned and placed in the reserved groove, so that a front-rear position of the drive axle is determined, and the output shaft of the drive axle can be coaxial with the movable shaft, wherein the pressing plate is used for upper and lower limiting and fixing of an existing drive axle.

Preferentially, one end of the transmission shaft is in linkage with a magnetic power brake, and a torque sensor is arranged between the magnetic power brake and the transmission shaft. Various performance testing under a condition of the same rotating speed of two ends of the drive axle under different loads can be achieved through the magnetic power brake.

Preferentially, a hand wheel is fixed to one end, away from the adjusting rod boss, of the adjusting rod. The above disposal facilitates rotation of the adjusting rod.

Preferentially, each of the first fixed hole and the second fixed hole is composed of a first segment and a second segment, an inner diameter of the second segment is larger than that of the first segment, the first bearing is fixed into the second segment of the first fixed hole, the second bearing is fixed into the second segment of the second fixed hole, a limiting plate is fixed to each of an axial side of the first fixed hole of the fixed plate and an axial side of the second fixed hole, the first bearing is limited between the first segment of the first fixed hole and the limiting plate, and the second bearing is limited between the first segment of the second fixed hole and the limiting plate. The above disposal facilitates axial limiting and fixing of the first bearing and the second bearing on the fixed plate.

Preferentially, an end portion of the output shaft of the drive axle forms an external thread and is provided with a locking nut in a matching manner, and the second coupler is in key connection with the output shaft and is limited to an inner side of the locking nut. The above disposal aims to avoid that the second coupler is separated from the output shaft of the drive axle.

The present invention has the advantages that synchronous load of the double output shafts of the scooter drive axle can be achieved, so that performance testing of the scooter drive axle is facilitated.

DETAILED DESCRIPTION OF THE INVENTION

The present invention is further described below in accordance with the accompanying drawings and specific implementations.

Figure 1:
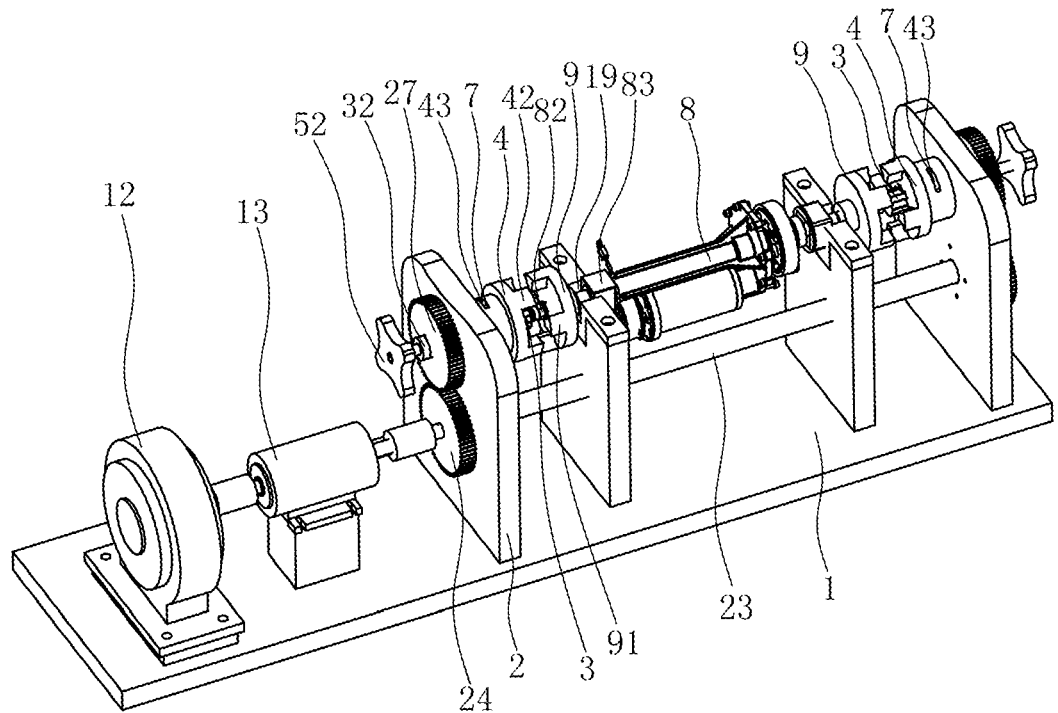
FIG. 1 is a structure diagram of the present invention.
Figure 2:
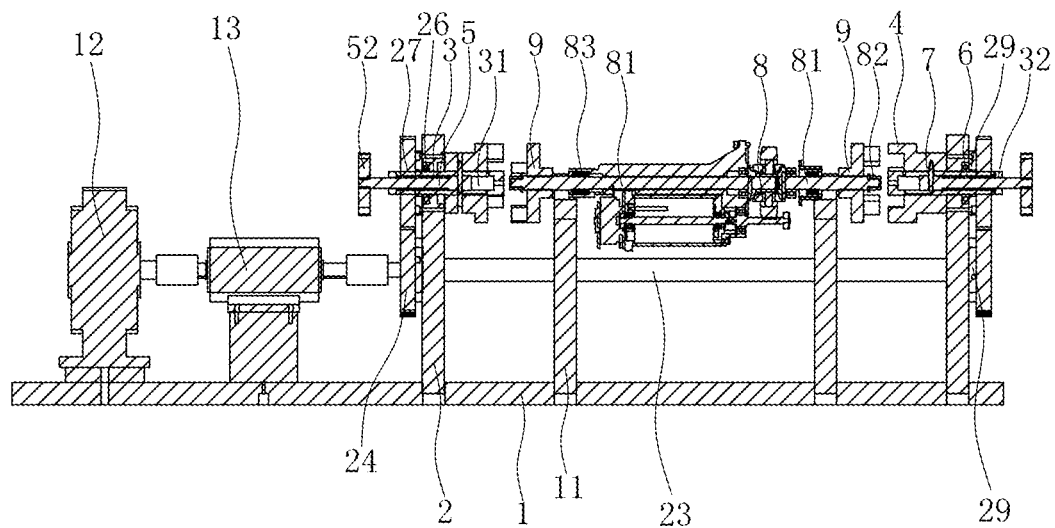
FIG. 2 is a sectional view of the present invention.
Figure 3:
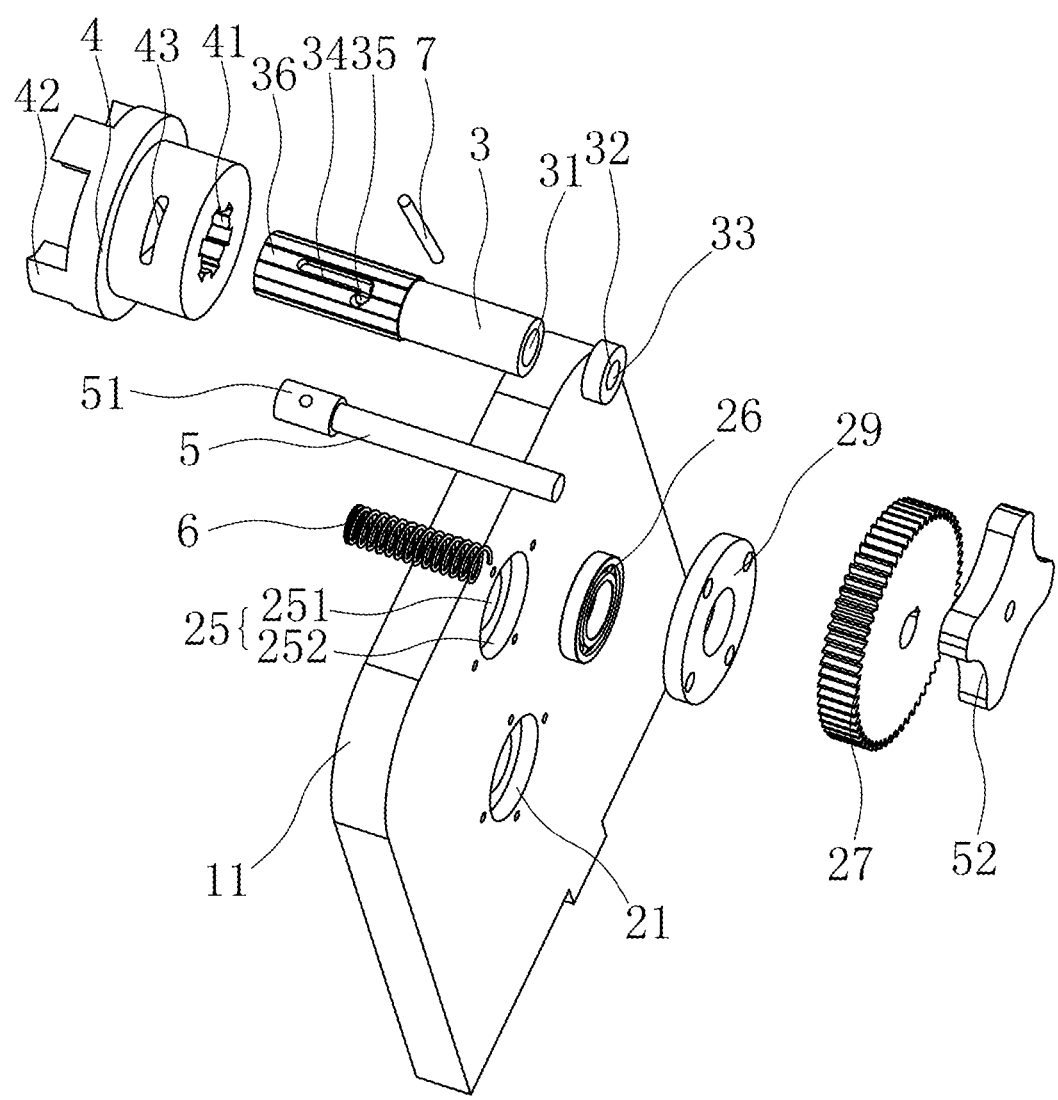
FIG. 3 is an exploding schematic diagram of a first coupler, a movable shaft, an adjusting rod and a positioning pin of the present invention.

From FIG. 1 to FIG. 3, a synchronous load simulating device for double output shafts of a scooter drive axle of the present invention includes a bottom plate 1, where each of a left side and a right side of the bottom plate 1 is provided with a fixed plate 2, each of lower portions of the fixed plates 2 forms a left-right through first fixed hole 21 and is provided with a first bearing in a matching manner, a transmission shaft 23 is fixed to the fixed plate 2 through the first bearing, and each of two ends of the transmission shaft 23 passes through one fixed plate 2 and is fixedly provided with a lower transmission gear 24.

Each of upper portions of the fixed plates 2 forms a left-right through second fixed hole 25 and is provided with a second bearing 26 in a matching manner, each second bearing 26 is fixed to a movable shaft 3, one end of the movable shaft 3 is located between the two fixed plates 2 and is matched with a first coupler 4, the other end of the movable shaft 3 passes through the fixed plate 2 and is fixedly provided with an upper transmission gear 27, and each upper transmission gear 27 is engaged with one lower transmission gear 24.

The movable shaft 3 has an accommodating groove 31 formed in an axial direction of the movable shaft 3, the accommodating groove 31 extends to one end away from the first coupler 4 and runs through an axial end face of the movable shaft 3, an adjusting rod 5 is disposed in the accommodating groove 31, one end of the adjusting rod 5 extends to a radial outer side to form an adjusting rod boss 51, the other end of the adjusting rod 5 extends to an outer side of the movable shaft 3, an end socket 32 is fixed to a groove opening position of the accommodating groove 31 of the movable shaft 3, the end socket 32 has a clearing hole 33 for the adjusting rod 5 to pass through, the adjusting rod 5 is sleeved with a compression spring 6, one end of the compression spring 6 urges the adjusting rod boss 51, and the other end of the compression spring 6 urges the end socket 32.

The movable shaft 3 forms a first groove 34 and a second groove 35 running through a radial inner wall and a radial outer wall of the movable shaft 3, the first groove 34 is formed in the axial direction of the movable shaft 3, an acute included angle is formed by the second groove 35 and the first groove 34, one end of the second groove 35 is oppositely located between two axial ends of the first groove 34, and the other end of the second groove 35 extends to a side of the upper transmission gear 27 and is connected with one end, close to the upper transmission gear 27, of the first groove 34.

The adjusting boss 51 is fixed to a positioning pin 7, and the positioning pin 7 passes through the first groove 34 or the second groove 35 so as to be fixed to the first coupler 4, a second coupler 9 is detachably fixed to each of the two output shafts 61 of the drive axle 8, and the second coupler 9 is used for being in linkage with the first coupler 4.

The drive axle 8 is placed between the two fixed plates 2; when the positioning pin 7 is located in the first groove 34, under the effect of the compression spring 6, the adjusting rod 5 is pushed so as to drive the first coupler 4 to move towards the second coupler 9, and when the positioning pin 7 is located in the second groove 35, under the effect of the compression spring 6, the adjusting rod 5 is pushed, so that the positioning pin 7 is driven to be located at one end, away from the lower transmission gear 24, of the second groove 35, and the second coupler 9 and the first coupler 4 are separated from each other.

The first coupler 4 has a through groove through in an axial direction, a radial inner wall of the through groove and the movable shaft 3 radially outwardly form a plurality of guide bumps 41 and guide grooves 36 which are mutually matched and annularly and uniformly disposed at intervals, and each of the guide bumps 41 and the guide grooves 36 is disposed in an axial direction of the movable shaft. The guide bumps 41 are arranged on the first coupler 4, and the guide grooves 36 are disposed at one end, away from the upper transmission gear 27, of the movable shaft 3. The first coupler 4 forms an inside and outside through matching groove 43, an end portion of the positioning pin 7 is located in the matching groove 43, and a radial section, along the first coupler 4, of the matching groove 43 is disposed in a shape of a sector. Each of two opposite sides of the movable shaft 3 is provided with the first groove 34 and the second groove 35, two opposite sides of the first coupler 4 are provided with the matching grooves 43, a middle portion of the positioning pin 7 is fixed to the adjusting rod boss 51 of the adjusting rod 5, and each of two ends of the positioning pin 7 passes through the movable shaft 3 so as to extend into one matching groove 43, wherein a hand wheel 52 is fixed to one end, away from the adjusting rod boss 51, of the adjusting rod 5.

The first coupler 4 forms four first linkage bumps 42 facing the second coupler 9, the second coupler 9 forms four second linkage bumps 91 facing the first coupler 4, when the first coupler 4 is matched with the second coupler 9, each first linkage bump 42 is located between two second linkage bumps 91, and each second linkage bump 91 is located between two first linkage bumps 42. An end portion of the output shaft 81 of the drive axle 8 forms an external thread and is provided with a locking nut 82 in a matching manner, and the second coupler 9 is in key connection with the output shaft 81 and is limited to an inner side of the locking nut 82.

The bottom plate 1 is provided with two vertical plates 11, an upper end surface of the vertical plate 11 is downwards recessed so as to form a reserved groove 19, a groove bottom of the reserved groove 19 is a transverse flat surface, a front groove wall and a rear groove wall of the reserved groove 19 are vertical flat surfaces, a pressing plate is disposed on an upper side of the vertical plate 11, and the pressing plate is detachably fixed to the vertical plate through a fastener. One end of the transmission shaft 23 is in linkage with a magnetic power brake 12, and a torque sensor 13 is arranged between the magnetic power brake 12 and the transmission shaft 23. The reserved groove 19 forms a reserved groove with a shape the same as that of the fixed base 83 on the fixed pipe of the drive axle, and appearance of the fixed base 83 can be positioned in the reserved groove 19.

Each of the first fixed hole 21 and the second fixed hole 25 is composed of a first segment 251 and a second segment 252, an inner diameter of the second segment is larger than that of the first segment, the first bearing is fixed into the second segment of the first fixed hole, the second bearing 26 is fixed into the second segment 252 of the second fixed hole 25, a limiting plate 29 is fixed to each of an axial side of the first fixed hole of the fixed plate 2 and an axial side of the second fixed hole, the first bearing is limited between the first segment of the first fixed hole and the limiting plate, and the second bearing 26 is limited between the first segment 251 of the second fixed hole and the limiting plate 29.

When the device of the present invention is used, the second coupler capable of being matched with the first coupler is fixed to each of end portions of the two output shafts of the drive axle, then the drive axle is placed on an upper side of the bottom plate, then limiting of an upper-lower position of the drive axle is achieved through the reserved groove of the vertical plate and the pressing plate, and determining of a front-rear position of the drive axle is achieved by means of matching of the reserved groove of the vertical plate and the fixed base of the drive axle. Then the adjusting rod is rotated, so that the adjusting rod drives the positioning pin to move in the second groove, and the positioning pin moves towards a side of the upper transmission gear. When the positioning pin is moved to a bottom, that is, when the positioning pin is moved to one end where the first groove is connected with the second groove, a detecting person looses the positioning pin; because the first groove is parallel with an axis of the movable shaft, under the effect of the compression spring, the positioning pin can drive the first coupler to move along the first groove to a side of the drive axle, so that the first coupler can be matched with the second coupler. The adjusting rods on the left side and the right side are rotated, so that each of the two first couplers can be matched with one second coupler, the two output shafts of the drive axle perform linkage through the second coupler, the first coupler, the movable shaft, the upper transmission gear, the lower transmission gear and the transmission shaft, synchronous load simulating of the two output shafts of the drive axle is achieved, and subsequent electrical performance testing is conveniently performed, wherein various performance testing under a condition of the same rotating speed of two ends of the drive axle under different loads can be achieved through the magnetic power brake.

What is claimed is:

1. A synchronous load simulating device for double output shafts of a scooter drive axle, which is characterized by comprising a bottom plate, wherein each of a left side and a right side of the bottom plate is provided with a fixed plate, each of lower portions of the fixed plates forms a left-right through first fixed hole and is provided with a first bearing in a matching manner, a transmission shaft is fixed to the fixed plate through the first bearing, each of two ends of the transmission shaft passes through one fixed plate and is fixedly provided with a lower transmission gear, each of upper portions of the fixed plates forms a left-right through second fixed hole and is provided with a second bearing in a matching manner, each second bearing is fixed to a movable shaft, one end of the movable shaft is located between the two fixed plates and is matched with a first coupler, the other end of the movable shaft passes through the fixed plate and is fixedly provided with an upper transmission gear, each upper transmission gear is engaged with one lower transmission gear, the movable shaft has an accommodating groove formed in an axial direction of the movable shaft, the accommodating groove extends to one end away from the first coupler and runs through an axial end face of the movable shaft, an adjusting rod is disposed in the accommodating groove, one end of the adjusting rod extends to a radial outer side to form an adjusting rod boss, the other end of the adjusting rod extends to an outer side of the movable shaft, an end socket is fixed to a groove opening position of the accommodating groove of the movable shaft, the end socket has a clearing hole for the adjusting rod to pass through, the adjusting rod is sleeved with a compression spring, one end of the compression spring urges the adjusting rod boss, the other end of the compression spring urges the end socket, the movable shaft forms a first groove and a second groove running through a radial inner wall and a radial outer wall of the movable shaft, the first groove is formed in the axial direction of the movable shaft, an acute included angle is formed by the second groove and the first groove, one end of the second groove is oppositely located between two axial ends of the first groove, the other end of the second groove extends to a side of the upper transmission gear and is connected with one end, close to the upper transmission gear, of the first groove, the adjusting rod boss is fixed to a positioning pin, the positioning pin passes through the first groove or the second groove so as to be fixed to the first coupler, a second coupler is detachably fixed to each of the two output shafts of the drive axle, and the second coupler is used for being in linkage with the first coupler; the drive axle is placed between the two fixed plates, when the positioning pin is located in the first groove, under the effect of the compression spring, the adjusting rod is pushed so as to drive the first coupler to move towards the second coupler, and when the positioning pin is located in the second groove, under the effect of the compression spring, the positioning pin is pushed to one end, away from the upper transmission gear, of the second groove, and the second coupler and the first coupler are separated from each other.

2. The synchronous load simulating device for the double output shafts of the scooter drive axle according to claim 1, which is characterized in that the first coupler has a through groove through in an axial direction, a radial inner wall of the through groove and the movable shaft radially outwardly form a plurality of guide bumps and guide grooves which are mutually matched and annularly and uniformly disposed at intervals, and each of the guide bumps and the guide grooves is disposed in the axial direction of the movable shaft.

3. The synchronous load simulating device for the double output shafts of the scooter drive axle according to claim 1, which is characterized in that the first coupler forms a plurality of first linkage bumps facing the second coupler, the second coupler forms a plurality of second linkage bumps facing the first coupler, when the first coupler is matched with the second coupler, each first linkage bump is located between two second linkage bumps, and each second linkage bump is located between two first linkage bumps.

4. The synchronous load simulating device for the double output shafts of the scooter drive axle according to claim 1, which is characterized in that the first coupler has a through groove through in an axial direction so as to be used for being matched with the movable shaft, the first coupler forms an inside and outside through matching groove, an end portion of the positioning pin is located in the matching groove, and a radial section, along the first coupler, of the matching groove is disposed in a shape of a sector.

5. The synchronous load simulating device for the double output shafts of the scooter drive axle according to claim 4, which is characterized in that each of two opposite sides of the movable shaft is provided with the first groove and the second groove, two opposite sides of the first coupler are provided with the matching grooves, a middle portion of the positioning pin is fixed to the adjusting rod boss of the adjusting rod, and each of two ends of the positioning pin passes through the movable shaft so as to extend into one matching groove.

6. The synchronous load simulating device for the double output shafts of the scooter drive axle according to claim 1, which is characterized in that the bottom plate is provided with two vertical plates, an upper end surface of the vertical plate is downwards recessed so as to form a reserved groove, a groove bottom of the reserved groove is a flat surface, a front groove wall or/and a rear groove wall of the reserved groove is a flat surface, a pressing plate is disposed on an upper side of the vertical plate, the pressing plate is detachably fixed to the vertical plate through a fastener, or the pressing plate is fixed to a lower end of a lifting rod of a lifting device.

7. The synchronous load simulating device for the double output shafts of the scooter drive axle according to claim 1, which is characterized in that one end of the transmission shaft is in linkage with a magnetic power brake, and a torque sensor is arranged between the magnetic power brake and the transmission shaft.

8. The synchronous load simulating device for the double output shafts of the scooter drive axle according to claim 1, which is characterized in that a hand wheel is fixed to one end, away from the adjusting rod boss, of the adjusting rod.

9. The synchronous load simulating device for the double output shafts of the scooter drive axle according to claim 1, which is characterized in that each of the first fixed hole and the second fixed hole is composed of a first segment and a second segment, an inner diameter of the second segment is larger than that of the first segment, the first bearing is fixed into the second segment of the first fixed hole, the second bearing is fixed into the second segment of the second fixed hole, a limiting plate is fixed to each of an axial side of the first fixed hole of the fixed plate and an axial side of the second fixed hole, the first bearing is limited between the first segment of the first fixed hole and the limiting plate, and the second bearing is limited between the first segment of the second fixed hole and the limiting plate.

10. The synchronous load simulating device for the double output shafts of the scooter drive axle according to claim 1, which is characterized in that an end portion of the output shaft of the drive axle forms an external thread and is provided with a locking nut in a matching manner, and the second coupler is in key connection with the output shaft and is limited to an inner side of the locking nut.

* * * * *